United States Patent
Fedec et al.

(10) Patent No.: US 11,905,347 B2
(45) Date of Patent: *Feb. 20, 2024

(54) PROPYLENE-ETHYLENE RANDOM COPOLYMERS WITH LOW XS/ET RATIO AND HIGH MFR

(71) Applicant: W.R. GRACE & CO.- CONN., Columbia, MD (US)

(72) Inventors: Matthew John Fedec, Columbia, MD (US); Jan Willem Van Egmond, Columbia, MD (US); John Kalevi Kaarto, Columbia, MD (US); Amaia Montoya-Goni, Columbia, MD (US)

(73) Assignee: W.R. GRACE & CO .- CONN., Columbia, MD (US)

( * ) Notice: Subject to any disclaimer, the term of this patent is extended or adjusted under 35 U.S.C. 154(b) by 362 days.

This patent is subject to a terminal disclaimer.

(21) Appl. No.: 16/972,894

(22) PCT Filed: Jun. 7, 2019

(86) PCT No.: PCT/US2019/036053
§ 371 (c)(1),
(2) Date: Dec. 7, 2020

(87) PCT Pub. No.: WO2019/241066
PCT Pub. Date: Dec. 19, 2019

(65) Prior Publication Data
US 2021/0246240 A1 Aug. 12, 2021

Related U.S. Application Data

(60) Provisional application No. 62/683,124, filed on Jun. 11, 2018.

(51) Int. Cl.
| | | |
|---|---|---|
| C08F 210/16 | (2006.01) | |
| C08F 210/06 | (2006.01) | |
| C08J 5/18 | (2006.01) | |
| C08K 5/1575 | (2006.01) | |

(52) U.S. Cl.
CPC .......... C08F 210/06 (2013.01); C08F 210/16 (2013.01); C08J 5/18 (2013.01); C08K 5/1575 (2013.01); C08F 2500/12 (2013.01); C08F 2500/35 (2021.01); C08J 2323/14 (2013.01); C08J 2323/16 (2013.01)

(58) Field of Classification Search
CPC .............................. C08F 210/16; C08F 210/06
See application file for complete search history.

(56) References Cited

U.S. PATENT DOCUMENTS

| | | | |
|---|---|---|---|
| 3,256,367 A | 6/1966 | Jayne et al. | |
| 6,723,795 B1 | 4/2004 | Dupire et al. | |
| 7,772,338 B2 * | 8/2010 | Terreur | C08F 10/06 526/124.3 |
| 8,541,507 B2 * | 9/2013 | Doshev | C08L 23/12 525/191 |
| 9,650,504 B2 | 5/2017 | Kastner et al. | |
| 2009/0118451 A1 * | 5/2009 | Fuchs | C08F 210/16 526/351 |
| 2012/0015170 A1 | 1/2012 | Doshev et al. | |
| 2016/0115262 A1 * | 4/2016 | Wang | C08F 210/06 526/159 |
| 2021/0253755 A1 * | 8/2021 | Fedec | C08F 210/06 |

FOREIGN PATENT DOCUMENTS

| | | |
|---|---|---|
| JP | 2009-512750 | 3/2009 |
| JP | 2009-155422 | 7/2009 |
| RU | 2471811 C2 | 1/2013 |
| RU | 2647579 C2 | 3/2018 |
| WO | WO-2007/122239 A1 | 4/2007 |
| WO | WO-2007/1222239 A1 | 11/2007 |
| WO | WO-2018/191212 A1 | 4/2018 |
| WO | WO-2017/188255 A1 | 2/2019 |
| WO | WO-2019/241066 A1 | 12/2019 |

OTHER PUBLICATIONS

Foreign Office Action on RU patent application No. 2020138968 dated Nov. 28, 2022.
First Examination Report on IN patent appl. No. 202017051133 dated Jun. 16, 2022.
Foreign Office Action on ID patent application No. P00202009304 dated Sep. 18, 2022 (6 pages).
Foreign Search Report on EP 19818756.9 dated May 17, 2022.
Torvald Vestberg et al : "Poly(propylene-co-ethylene) Produced with a Conventional and a Self Supported Ziegler-Natta Catalyst : Effect of Ethylene and Hydrogen Concentration on Activity and Polymer Structure", Journal of Applied Polymer Science, vol. 124, No. 6, Dec. 7, 2011 (Dec. 7, 2011) , pp. 4889-4896.
Foreign Office Action on JP patent application No. 2020-567987 dated Feb. 28, 2023 (12 pages).

* cited by examiner

*Primary Examiner* — Rip A Lee
(74) *Attorney, Agent, or Firm* — Foley & Lardner LLP

(57) ABSTRACT

Propylene and alpha olefin random copolymers are disclosed that have excellent flow characteristics. For instance, the copolymers can be formulated so as to have a melt flow rate of greater than about 45 g/10 min. While still retaining the above flow characteristics, the copolymer can also be formulated to have greater stiffness, low xylene soluble content, and excellent transparency characteristics especially when combined with one or more clarifying agents.

20 Claims, No Drawings

PROPYLENE-ETHYLENE RANDOM COPOLYMERS WITH LOW XS/ET RATIO AND HIGH MFR

RELATED APPLICATIONS

The present application is based on and claims priority to U.S. Provisional Patent application Ser. No. 62/683,124, filed on Jun. 11, 2018, which is incorporated herein by reference.

BACKGROUND

Polypropylene polymers are highly versatile thermoplastic polymers that can be used in numerous and diverse applications. For example, polypropylene polymers can be extruded to form various different shapes including films and fibers, and it can be molded into articles having relatively simple or complex shapes. Polypropylene polymers are used to produce, for instance, carpets, carpet backing, food packaging, rigid packaging, technical parts such as automotive parts, waste and pressure pipes, and the like, and various consumer products including furniture parts, housewares, and toys. Polypropylene polymers can for instance, have low density, high stiffness, heat resistance, chemical inertness, good transparency properties, and are recyclable. The properties of polypropylene polymers can be modified and tailored to a particular use by combining; propylene monomers with other monomers in order to impart various properties.

For example copolymerizing propylene with small amounts of ethylene produces random copolymers having unique properties. The resulting copolymer, for instance, can have a lower degree of crystallinity than a polypropylene homopolymer leading to improved transparency, impact resistance, and lower heat sealing temperatures. The random propylene-ethylene copolymers also generally have a lower melting temperature which can limit their use in high temperature applications. In addition, when subjected to higher temperatures, the transparency of the polymers has a tendency to degrade. For instance, not only can further crystallization occur during aging but also blooming can occur that produces a hazy surface layer.

In view of the above, a need currently exists for a random propylene copolymer that is capable of withstanding higher temperatures. In particular, a need exists for a random propylene copolymer that has increased stiffness and therefore greater heat resistance. A need also exists, for a random propylene copolymer with improved transparency characteristics, especially after aging. A need also exists for an improved propylene copolymer that has one of the above characteristics and also has improved flow characteristics making the polymer well suited for use in injection molding applications.

SUMMARY

In general, the present disclosure is directed to propylene copolymers, such as random propylene-ethylene copolymers, that have been found to have an excellent balance of properties. The propylene copolymers in accordance with the present disclosure are made with a Ziegler-Natta catalyst (without the use of metallocenes) in a manner that produces a random copolymer having a very low xylene solubles fraction or content. The random copolymers also have relatively high stiffness properties and are resistant to blooming during heat aging, giving the polymers excellent transparency characteristics. The random copolymers can also be made so as to have a relatively higher heat deflection temperature making the polymers well suited for use at higher temperatures in relation to many copolymers made in the past. Of particular advantage, the propylene random copolymers of the present disclosure can be made with the above properties while still have excellent flow characteristics. For instance, the copolymers can have a melt flow rate of greater than about 45 g/10 min making the polymers well suited for use in injection molding applications. The high melt flow characteristics, for instance, allow the polymers to be used for injection molding articles and products that have relatively thin walls and/or complex shapes.

In one embodiment, for instance, the present disclosure is directed to a propylene copolymer having high flow characteristics containing propylene as a primary monomer and having an alpha olefin comonomer content of less than about 5% by weight, such as from about 3% to about 5% by weight, such as from 3.1% to about 4.7% by weight. In one embodiment, the comonomer is ethylene. The propylene copolymer is also formed having a Very low xylene soluble fraction such that the xylene soluble fraction (XS) to comonomer or ethylene (ET) ratio is less than or equal to about 1.51, such as from about 1.2 to about 1.5. In addition, the copolymer has a melt flow rate of greater than about 45 g/10 min, such as from about 45 g/10 min to about 140 g/10 min, such as from about 45 g/10 min to about 120 g/10 min, such as from about 45 g/10 min to about 100 g/10 min. For example, in one embodiment, the copolymer can be formulated so as to have a melt flow rate of from about 50 g/min to about 80 g/10 min. In an alternative embodiment, the copolymer can be formulated so as to have a melt flow rate of from about 80 g/10 min to about 100 g/10 min.

In general, the xylene soluble fraction contained within the copolymer is less than about 7%, such as less than about 6%, such as less than about 5%, and generally greater than about 1%, such as greater than about 2%. In order to form the propylene random copolymer, a Ziegler-Natta catalyst system can be used that includes an internal electron donor comprising a substituted phenylene aromatic diester. The catalyst system can further include other donors, such as dicyclopentyldimethoxysilane or n-propyltrimethoxysilane.

The random propylene copolymer of the present disclosure can be used to form a polymer composition for forming various molded articles. The random propylene copolymer, for instance, can be present in the composition in an amount greater than about 70% by weight, such as in an amount greater than about 80% by weight, such as in an amount of about 90% by weight, such as in an amount greater than about 95% by weight, such as greater than about 98% by weight, such as greater than about 99% by weight. The composition can contain various other additives and ingredients including an antioxidant, an acid scavenger, and/or an anti-static agent. In one embodiment, the polymer composition can contain a clarifying agent. The clarifying agent, for instance, can comprise a dibenzyl sorbitol.

The polymer composition can be formulated to have excellent transparency characteristics. For instance, the composition can display a haze at 40 mil of less than about 15% about and wherein after thermal aging for 24 hours at 55° C., the haze decreases by no more than about 15%, such as no more than about 14%, such as no more than about 13%, such as no more than about 12%.

The present disclosure is also directed to injection molded articles made from the polymer composition described above. In one embodiment, the polymer article comprises a hot fill packaging container that is intended to be loaded with a food item while hot, such as, for example, take-out food. The polymer composition of the present disclosure can also be used to form storage containers, such as containers or organizer trays that are designed to be used in un-air conditioned spaces such as garages, attics, warehouses, and the like. A wide variety of embodiments are contemplated, including media packaging (e.g., for DVDs).

DETAILED DESCRIPTION

The present disclosure includes propylene-alpha olefin copolymer compositions and methods of producing the propylene copolymer compositions. The compositions can include a propylene-ethylene random copolymer. The propylene-ethylene copolymer compositions can be particularly well suited for hot fill packaging of foodstuffs. Specifically, the propylene copolymer compositions of the present disclosure can be used to form rigid hot fill containers and films for packaging and sealing food and beverages. The compositions of the present disclosure can be particularly beneficial for use with foodstuffs that must be pasteurized at the time of packaging.

In addition to hot filled packaging containers, the present disclosure can be used in numerous and various other applications. For instance, the propylene random copolymers and compositions containing; the copolymers can be used to produce other storage containers. For instance, the polymer composition of the present disclosure can be used to produce transparent or semitransparent long term storage containers designed to be used in un-air conditioned spaces, such as attics, garages, warehouses, or other storage facilities where the containers may be subjected to temperature cycles including relatively high temperatures and relatively cold temperatures.

Advantages of the various propylene-ethylene copolymer compositions of the present disclosure include increased stiffness for use in containers. The compositions can also have reduced blooming and reduced haze, even under elevated temperature conditions and over extended periods of time. Compositions of the present disclosure can have reduced extractable and xylene soluble content, making the polymer compositions safe for consumer use and more readily complaint with U.S. Food and Drug Administration (FDA) standards. The propylene-ethylene copolymer compositions of the present disclosure can also be used for packaging designed for microwave reheating of stored foods.

The propylene copolymer of the present disclosure can provide the above advantages and can be used in the above applications while still retaining excellent flow characteristics making the polymer well suited for injection molding processes. For instance, the flow characteristics of the polymer facilitate molding of thin walled articles and articles having a complex shape. For example, the propylene copolymer of the present disclosure can have a melt flow rate of greater than about 45 g/10 min, such as greater than about 50 g/10 min, such as greater than about 55 g/10 min, such as greater than about 60 g/10 min, such as greater than about 65 g/10 min, such as greater than about 70 g/10 min, such as greater than about 75 g/10 min, such as greater than about 80 g/10 min, such as greater than about 85 g/10 min and generally less than about 150 g/10 min, such as less than about 125 g/10 min, such as less than about 100 g/10 min.

I. DEFINITIONS AND TESTING PROCEDURES

The term "propylene-ethylene copolymer", as used herein, is a copolymer containing a majority weight percent propylene monomer with ethylene monomer as a secondary constituent. A "propylene-ethylene copolymer" (also sometimes referred to as a polypropylene random copolymer, PPR, PP-R, RCP or RACO) is a polymer having individual repeating units of the ethylene monomer present in a random or statistical distribution in the polymer chain.

Melt flow rate (MFR), as used herein, is measured in accordance with the ASTM D 1238 test method at 230° C. with a 2.16 kg weight for propylene-based polymers. The melt flow rate can be measured in pellet form or on the reactor powder. When measuring the reactor powder, a stabilizing package can be added including 2000 ppm of CYANOX 2246 antioxidant (methylenebis(4-methyl-6-tert-butylphenol) 2000 ppm of IRGAFOS 168 antioxidant (tris (2,4-di-tert-butylphenyl)phosphite) and 1000 ppm of acid scavenger ZnO.

Xylene solubles (XS) is defined as the weight percent of resin that remains in solution after a sample of polypropylene random copolymer resin is dissolved in hot xylene and the solution is allowed to cool to 25° C. This is also referred to as the gravimetric XS method according to ASTM D5492-98 using a 90 minute precipitation time and is also referred to herein as the "wet method". Xylene solubles is measured on the reactor powder without the addition of any other additives.

The Viscotek method is calibrated against the gravimetric ASTM method, which is conducted as follows. The xylene soluble portion is determined by a method adapted from ASTM D5492-06 and also sometimes referred to herein as the "wet method". The procedure consists of weighing 2 g of sample and dissolving the sample in 200 ml o-xylene in a 400 ml flask with 24/40 joint. The flask is connected to a water cooled condenser and the contents are stirred and heated to reflux under nitrogen ($N_2$), and then maintained at reflux for an additional 30 minutes. The solution is then cooled in a temperature controlled water bath at 25° C. 90 minutes to allow the crystallization of the xylene insoluble fraction. Once the solution is cooled and the insoluble fraction precipitates from the solution, the separation of the xylene soluble portion (XS) from the xylene insoluble portion (XI) is achieved by filtering through 25 micron filter paper. One hundred ml of the filtrate is collected into a pre-weighed aluminum pan, and the o-xylene is evaporated from this 100 ml of filtrate under a nitrogen stream. Once the solvent is evaporated, the pan and contents are placed in a 100° C. vacuum oven for 30 minutes or until dry. The pan is then allowed to cool to room temperature and weighed. The xylene soluble portion is calculated as XS (wt %)= $[(m_3-m_2)*2/m_1]*100$, where $m_1$ is the original weight of the sample used, $m_2$ is the weight of empty aluminum pan, and $m_3$ is the weight of the pan and residue (the asterisk, *, here and elsewhere in the disclosure indicates that the identified terms or values are multiplied).

The term "tacticity" generally refers to the relative stereochemistry of adjacent chiral centers within in a macromolecule or polymer. For example, in a propylene-based polymer, the chirality of adjacent monomers, such as two propylene monomers, can be of either like or opposite configuration. The term "diad" is used to designate two contiguous monomers and three adjacent monomers are called a "triad." Tithe chirality of adjacent monomers is of the same relative configuration, the diad is considered isotactic, if opposite in configuration, it is termed syndiotactic. Another way to describe the configurational relationship is to term contiguous pairs of monomers having the same chirality as meso (m) and those of opposite configuration racemic (r).

Tacticity or stereochemistry of macromolecules generally and polypropylene or polypropylene random copolymers in particular can be described or quantified by referring to triad concentration. An isotactic triad, typically identified with the shorthand reference "mm", is made up of two adjacent meso diads, which have the same configuration, and so the stereoregularity of the triad is identified as "mm". If two adjacent monomers in a three-monomer sequence have the same chirality and that is different from the relative configuration of the third unit, this triad has 'mr' tacticity. An 'rr' Iliad has the middle monomer unit having an opposite configuration from either neighbor. The fraction of each type of triad in the polymer can be determined and when multiplied by 100 indicates the percentage of that type found in the polymer. The mm percentage is used to identify and characterize the polymers herein.

The sequence distribution of monomers in the polymer may be determined by $^{13}$C-NMR, which can also locate ethylene residues in relation to the neighboring propylene residues. $^{13}$C NMR can be used to measure ethylene content, Koenig B-value, triad distribution, and triad tacticity, and is performed as follows:

The samples are prepared by adding approximately 2.7 g of a 50/50 mixture of tetrachloroethane-d2/orthodichlorobenzene containing 0.025 M Cr(AcAc)3 to 0.20 g sample in a Norell 1001-7 10 mm. NMR tube. The samples are dissolved and homogenized by heating the tube and its contents to 150° C. using a heating block and heat gun. Each sample is visually inspected to ensure homogeneity.

The data are collected using a Bruker 400 MHz spectrometer equipped with a Bruker Dual DLL high-temperature CryoProbe. The data are acquired using 320 transients per data file, a 6 sec pulse repetition delay, 90 degree flip angles, and inverse gated decoupling with a sample temperature of 120° C. All measurements are made on non-spinning samples in locked mode. Samples are allowed to thermally equilibrate for 7 minutes prior to data acquisition. Percent mm tacticity and weight % ethylene are calculated according to methods commonly used in the art, which is briefly summarized as follows.

With respect to measuring the chemical shifts of the resonances, the methyl group of the third unit in a sequence of 5 contiguous propylene units consisting of head-to-tail bonds and having the same relative chirality is set to 21.83 ppm. The chemical shift of other carbon resonances are determined by using the above-mentioned value as a reference. The spectrum relating to the methyl carbon region (17.0-23 ppm) can be classified into the first region (21.1-21.9 ppm), the second region (20.4-21.0 ppm), the third region (19.5-20.4 ppm) and the fourth region (17.0-17.5 ppm), Each peak in the spectrum is assigned with reference to a literature source such as the articles in, for example, Polymer, T. Tsutsui et al., Vol. 30, Issue 7, (1989) 1350-1356 and/or Macromolecules, H. N. Cheng, 17 (1984) 1950-1955, the contents of which are incorporated herein by reference.

In the first region, the signal of the center methyl group in a PPP (mm) triad is located. In the second region, the signal of the center methyl group in a PPP (mr) triad and the methyl group of a propylene unit whose adjacent units are a propylene unit and an ethylene unit resonates (PPE-methyl group). In the third region, the signal of the center methyl group in a PPP (rr) triad and the methyl group of a propylene unit whose adjacent units are ethylene units resonate (EPE-methyl group).

PPP (mm), PPP (mr) and PPP (rr) have the following three-propylene units-chain structure with head-to-tail bonds, respectively. This is shown in the Fischer projection diagrams below.

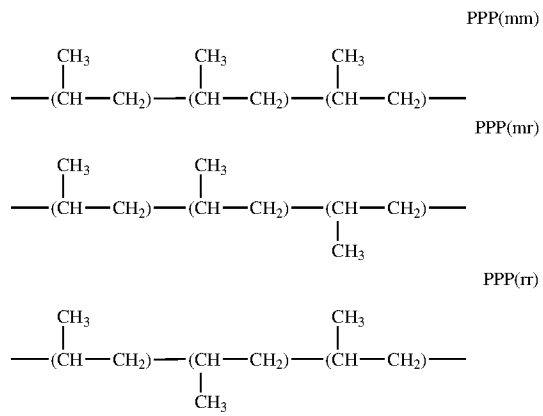

The triad tacticity (mm fraction) of the propylene random copolymer can be determined from a $^{13}$C-NMR spectrum of the propylene random copolymer using the following formula:

$$\text{mm Fraction} = \frac{PPP(\text{mm})}{PPP(\text{mm}) + PPP(mr) + PPP(rr)}$$

The peak areas used in the above calculation are not measured directly from the triad regions in the $^{13}$C-NMR spectrum. The intensities of the mr and rr triad regions need to have subtracted from them the areas due to EPP and EPE sequencing, respectively. The area can be determined from the signal at 30.8 ppm after subtracting from it one-hall the area of the sum of the signals between 26 and 27.2 ppm and the signal at 30.1 ppm. The area due to EPE can be determined from the signal at 33.2 ppm.

For convenience, ethylene content is also measured using a Fourier Transform Infrared method (FTIR) which is correlated to ethylene values determined using $^{13}$C NMR, noted above, as the primary method. The relationship and agreement between measurements conducted using the two methods is described in, e.g., J. R. Paxson, J. C. Randall, "Quantitative Measurement of Ethylene incorporation into Propylene Copolymers by Carbon-13 Nuclear Magnetic Resonance and Infrared Spectroscopy", Analytical Chemistry, Vol. 50 No. 13. November 1978, 1777-1780.

The "Koenig B-value" or "B-value" or chi statistic is one measure of randomness or blockiness in a propylene ethylene random copolymer. A Koenig B-value of 1.0 indicates a random copolymer and a value of zero indicates complete blocks of monomers A and B; in the present disclosure, propylene and ethylene, A Koenig TB-value of 2 indicates a perfectly alternating copolymer (i.e., a polymer defined by the structure A-B-A-B-A-B). The Koenig B-value can be calculated as: B=[EP]/(2[P][E]), where [EP] is the total mole fraction of EP dimers (EP+PE, or (EEP+PPE+PEP+EPE)), and [E] is the mole fraction ethylene, and [P]=1−[E]. See Koenig, Jack L.; Spectroscopy of Polymers, 2nd ed. for details of determining and calculating the Koenig B-value.

II. PROPYLENE-ETHYLENE RANDOM COPOLYMER COMPOSITIONS

Propylene-ethylene copolymer compositions of the present disclosure can include a majority weight percent propylene monomer with an alpha olefin monomer as a secondary constituent such as ethylene. The ethylene content (ET) of the propylene-ethylene copolymer compositions of the present disclosure can be from about 2.0 to about 5.0 percent by weight of the copolymer, preferably from about 3.0 to about 5.0 percent by weight, and more preferably from about 3.1 to about 4.7 percent by weight.

The xylene soluble (XS) fraction for the copolymers of the present invention (by the wet method) can be less than or equal to ($\leq$)7.0% by weight of the copolymer, or $\leq$6.0% by weight, more preferably $\leq$5.0% by weight, and still more preferably $\leq$4% by weight, for example, $\leq$6.5% by weight, $\leq$5.5% by weight, $\leq$4.5 by weight, or $\leq$3.5% by weight. The xylene soluble (XS) fraction is preferably in the range of from 2.0% to 7.0% by weight, from 3% to 7% by weight.

The propylene-ethylene copolymer can generally, have a melt flow rate of greater than about 45 g/10 min, such as greater than about 55 g/10 min, such as greater than about 65 g/10 min, such as greater than about 75 g/10 miry, such as greater than about 85 g/10 min, such as greater than about 95 g/10 min, such as greater than about 105 g/10 min, such as greater than about 115 g/10 min. The melt flow rate is generally less than about 145 g/10 min, such as less than about 120 g/10 min, such as less than about 100 g/10 min.

The weight ratio of xylene soluble (XS) to the ethylene content (ET) is an important aspect of the embodiments of the present disclosure and can be referred to as the xylene solubles to ethylene ratio, or the XS/ET ratio. The XS/ET ratio of propylene-ethylene copolymer compositions of the present disclosure can be less than or equal to ($\leq$)1.5, or $\leq$1.4, more preferably $\leq$1.2, and still more preferably $\leq$1.0, for example, $\leq$1.8, $\leq$1.4, $\leq$1.1, or $\leq$0.95. The XS/ET ratio can also be in the range of from 0.5 to 1.51, from 1.0 to 1.5, or from 1.2 to 1.5.

In one embodiment, the polymer composition may contain a nucleator. For instance, the nucleator may be an alpha nucleator. Examples of nucleators and/or clarifiers that may be used in the polymer composition include benzene amid derivatives, sorbitol derivatives, nonitol derivatives, and mixtures thereof. Particular examples of nucleating agents include NA-11 nucleator marketed by Adeka Palmarole. SAS, such as sodium 2,2'-methylene-bis-(4,6-di-tert-butylphenyl)phosphate. Other nucleators that may be used include the HPN nucleators marketed by Milliken and Company of Spartanburg, South Carolina including HPN-600ei. Other suitable clarifiers from Milliken include Millad NX8000 and Millad 3988i.

The copolymer of the present disclosure generally has a relatively broad molecular weight distribution. For instance, the molecular weight distribution (Mw/Mn) is generally greater than about 3.5, such as greater than about 3.8, such as greater than about 4, such as greater than about 4.3, such as greater than about 4.5, such as greater than about 4.8, such as greater than about 5, such as greater than about 5.2, such as greater than about 5.5, such as greater than about 5.7, such as greater than about 6 and is generally less than about 10, such as less than about 8, such as less than about 7.5. The weight average molecular weight is determined by GPC.

III. PROPYLENE-ETHYLENE RANDOM COPOLYMER PRODUCTION

Embodiments of the present invention can be made by any process for polymerizing propylene-based polymers known in the art. This includes the UNIPOL® gas phase process, using a supported Ziegler-Natty catalyst. Particularly preferable are CONSISTA® catalysts available from W.R. Grace & Co., Columbia, Md. Suitable polypropylene random copolymers may be produced using a single reactor or multiple reactors to produce a multimodal product. For some embodiments, it is preferred to use internal electron donors which do not contain phthalates.

Processes and catalyst compositions for preparing useful PP-R copolymers are disclosed, for example, in WO 2011/084628, and others are generally disclosed in U.S. Pat. Nos. 7,381,779; 7,491,670; 7,678,868; 7,781,363; and 7,989,383. Propylene-ethylene random copolymers having high molecular weight and low MFR are produced using stereo-specific catalysts and sometimes referred to as "6th generation" Ziegler-Natta catalysts containing non-phthalate internal donors, such as those disclosed in U.S. Pat. Nos. 8,288,585; 8,536,372; 8,778,826; US 2013/0338321; and/or WO 2010/078494 and others. Also suitable are so-called "4th generation" Ziegler-Natta catalysts, typically containing phthalate internal donors (e.g., diisobutyl phthalate, DIBP). Each of the forgoing cited patents are hereby incorporated by reference.

Procatalyst compositions suitable for use in producing the polypropylene random (PPR) copolymers include Ziegler-Natta procatalyst compositions. Any conventional Ziegler-Natta procatalyst may be used in the present catalyst composition as is commonly known in the art provided it is capable of producing the claimed PP-R copolymers. In an embodiment, the Ziegler-Nana procatalyst composition contains titanium moiety such as titanium chloride, magnesium moiety such as magnesium chloride, and an internal electron donor.

In an embodiment, the internal electron donor comprises a substituted phenylene aromatic diester. In an embodiment, a 1,2-phenylene aromatic diester is provided. The substituted 1,2-phenylene aromatic diester has the structure (I) below:

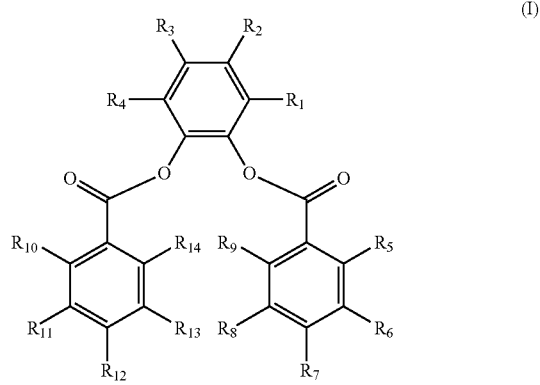

wherein $R_1$-$R_{14}$ are the same or different. Each of $R_1$-$R_{14}$ is selected from a hydrogen, substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. At least one of $R_1$-$R_{14}$ is not hydrogen.

As used herein, the term "hydrocarbyl" and "hydrocarbon" refer to substituents containing only hydrogen and carbon atoms, including branched or unbranched, saturated or unsaturated, cyclic, polycyclic, fused, or acyclic species, and combinations thereof. Nonlimiting examples of hydrocarbyl groups include alkyl-, cycloalkyl-, alkenyl-, alkadienyl-, cycloalkenyl-, cycloalkadienyl-, aryl-, aralkyl, alkylaryl, and alkynyl-groups.

As used herein, the terms "substituted hydrocarbyl" and "substituted hydrocarbon" refer to a hydrocarbyl group that is substituted with one or more nonhydrocarbyl substituent groups. A nonlimiting example of a nonhydrocarbyl substituent group is a heteroatom. As used herein, a "heteroatom" refers to an atom other than carbon or hydrogen. The heteroatom can be a non-carbon atom from Groups IV, V, VI, and VII of the Periodic Table. Nonlimiting examples of heteroatoms include: halogens (F, Cl, Br, I), N, O, P, B, S, and Si. A substituted hydrocarbyl group also includes a halohydrocarbyl group and a silicon-containing hydrocarbyl group. As used herein, the term "halohydrocarbyl" group refers to a hydrocarbyl group that is substituted with one or more halogen atoms. As used herein, the term "silicon-containing hydrocarbyl group" is a hydrocarbyl group that is substituted with one or more silicon atoms. The silicon atom(s) may or may not be in the carbon Chain.

The procatalyst precursor can include (i) magnesium, (ii) a transition metal compound of an element from Periodic Table groups IV to VIII, (iii) a halide, an oxyhalide, and/or an alkoxide of (i) and/or (ii), and (iv) combinations of (i), (ii), and (iii). Nonlimiting examples of suitable procatalyst precursors include halides, oxyhalides, and alkoxides of magnesium, manganese, titanium, vanadium, chromium, molybdenum, zirconium, hafnium, and combinations thereof.

In an embodiment, the procatalyst precursor is a magnesium moiety compound (MagMo), a mixed magnesium titanium compound (MagTi), or a benzoate-containing magnesium chloride compound (BenMag). In an embodiment, the procatalyst precursor is a magnesium moiety ("MagMo") precursor. The "MagMo precursor" contains magnesium as the sole metal component. The MagMo precursor includes a magnesium moiety. Nonlimiting examples of suitable magnesium moieties include anhydrous magnesium chloride and/or its alcohol adduct, magnesium alkoxide or aryloxide, mixed magnesium alkoxy halide, and/or carboxylated magnesium dialkoxide or aryloxide. In one embodiment, the MagMo precursor is a magnesium di($C_{1-4}$)alkoxide. In a further embodiment, the MagMo precursor is diethoxymagnesium.

In an embodiment, the procatalyst precursor is a mixed magnesium/titanium compound ("MagTi"). The "MagTi precursor" has the formula $Mg_dTi(OR^e)_fX_g$ wherein $R^e$ is an aliphatic or aromatic hydrocarbon radical having 1 to 14 carbon atoms or COR' wherein R' is an aliphatic or aromatic hydrocarbon radical having 1 to 14 carbon atoms; each OR' group is the same or different; X is independently chlorine, bromine or iodine, preferably chlorine; d is 0.5 to 56, or 2 to 4; f is 2 to 116 or 5 to 15; and g is 0.5 to 116, or 1 to 3. The precursors are prepared by controlled precipitation through removal of an alcohol from the reaction mixture used in their preparation. In an embodiment, a reaction medium comprises a mixture of an aromatic liquid, especially a chlorinated aromatic compound, most especially chlorobenzene, with an alkanol, especially ethanol. Suitable halogenating agents include titanium tetrabromide, titanium tetrachloride or titanium trichloride, especially titanium tetrachloride. Removal of the alkanol from the solution used in the halogenation results in precipitation of the solid precursor, having especially desirable morphology and surface area. Moreover, the resulting precursors are particularly uniform in particle size.

The present procatalyst composition can also include an internal electron donor. As used herein, an "internal electron donor" is a compound added during formation of the procatalyst composition that donates a pair of electrons to one or more metals present in the resultant procatalyst composition. Not bounded by any particular theory, it is believed that the internal electron donor assists in regulating the formation of active sites and thus enhances catalyst stereoselectivity. In an embodiment, the internal electron donor includes a substituted phenylene aromatic diester of structure (1), identified above.

In an embodiment, a procatalyst composition is provided which includes a combination of a magnesium moiety, a titanium moiety and an internal electron donor. The internal electron donor includes the substituted phenylene aromatic diester. The procatalyst composition is produced by way of a halogenation procedure described in detail in U.S. Pat. No. 8,536,372, incorporated herein by reference, which converts the procatalyst precursor and the substituted phenylene aromatic diester donor into the combination of the magnesium and titanium moieties, into which the internal electron donor is incorporated. The procatalyst precursor from which the procatalyst composition is formed can be the magnesium moiety precursor, the mixed magnesium/titanium precursor, or the benzoate-containing magnesium chloride precursor.

In an embodiment; the magnesium moiety is a magnesium halide. In another embodiment, the magnesium halide is magnesium chloride, or magnesium chloride alcohol adduct. In an embodiment, the titanium moiety is a titanium halide such as a titanium chloride. In another embodiment the titanium moiety is titanium tetrachloride. In another embodiment, the procatalyst composition includes a magnesium chloride support upon which a titanium chloride is deposited and upon which the internal electron donor is incorporated.

In an embodiment, the internal electron donor of the procatalyst composition includes the substituted phenylene aromatic diester of structure (I), illustrated above, wherein $R_1$-$R_{14}$ are the same or different; each of $R_1$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof; and at least one of $R_1$-$R_{14}$ is not hydrogen.

In an embodiment, at least one (or two, or three, or four) R group(s) of $R_1$-$R_4$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one (or some, or all) R group(s) of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_5$-$R_9$ and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, at least one of $R_1$-$R_4$ and at least one of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof. In another embodiment, at least one of $R_1$-$R_4$ at least one $R_5$-$R_9$ of and at least one of $R_{10}$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a heteroatom, and combinations thereof.

In an embodiment, any consecutive R groups in $R_1$-$R_4$, and/or any consecutive R groups in $R_5$-$R_9$, and/or any consecutive R groups in $R_{10}$-$R_{14}$ may be linked to form an inter-cyclic or an intra-cyclic structure. The inter-/intra-cyclic structure may or may not be aromatic. In an embodiment, the inter-/intra-cyclic structure is a $C_5$ or a $C_6$ membered ring.

In an embodiment, at least one of $R_1$-$R_4$ is selected from a substituted hydrocarbyl group having 1 to 20 carbon atoms, an unsubstituted hydrocarbyl group having 1 to 20 carbon atoms, and combinations thereof. Optionally, at least one of $R_5$-$R_{14}$ may be a halogen atom or an alkoxy group having 1 to 20 carbon atoms. Optionally, $R_1$-$R_4$, and/or $R_5$-$R_9$, and/or $R_{10}$-$R_{14}$ may be linked to form an inter-cyclic structure or an intra-cyclic structure. The inter-cyclic structure and/or the intra-cyclic structure may or may not be aromatic.

In an embodiment; any consecutive R groups in $R_1$-$R_4$, and/or in $R_5$-$R_9$, and/or in $R_{10}$-$R_{14}$, may be members of a $C_5$-$C_6$-membered ring.

In an embodiment, structure (I) includes $R_1$, $R_3$ and $R_4$ as hydrogen. $R_2$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each of $R_5$-$R_{14}$ is selected from hydrogen, a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, $R_2$ is selected from a $C_1$-$C_8$ alkyl group, a $C_3$-$C_6$ cycloalkyl, or a substituted $C_3$-$C_6$ cycloalkyl group. $R_2$ can be a methyl group, an ethyl group, a n-propyl group, an isopropyl group, a t-butyl group, an isobutyl group, a sec-butyl group, a 2,4,4-trimethylpentan-2-yl group, a cyclopentyl group, and a cyclohexyl group.

In an embodiment, structure (I) includes $R_2$ that is methyl, and each of $R_5$-$R_{14}$ is hydrogen. In an embodiment, structure (I) includes $R_2$ that is ethyl, and each of $R_5$-$R_{14}$ is hydrogen. In an embodiment, structure (I) includes $R_2$ that is t-butyl, and each of $R_5$-$R_{14}$ is hydrogen. In an embodiment, structure (I) includes lam, that is ethoxycarbonyl, and each of $R_5$-$R_{14}$ is hydrogen.

In an embodiment, structure (I) includes $R_2$, $R_3$ and $R_4$ each as hydrogen and $R_1$ is selected from a substituted hydrocarbyl group having 1 to 20 carbon atoms, an unsubstituted hydrocarbyl group having 1 to 20 carbon atoms, and combinations thereof. $R_5$-$R_{14}$ are the same or different and each is selected from hydrogen; a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (I) includes $R_1$ that is methyl, and each of $R_5$-$R_{14}$ is hydrogen.

In an embodiment, structure (I) includes $R_2$ and $R_4$ that are hydrogen and $R_1$ and $R_3$ are the same or different. Each of $R_1$ and $R_3$ is selected from a substituted hydrocarbyl group having 1 to 20 carbon atoms; an unsubstituted hydrocarbyl group having 1 to 20 carbon atoms, and combinations thereof. $R_5$-$R_{14}$ are the same or different and each of $R_5$-$R_{14}$ is selected from a substituted hydrocarbyl group having 1 to 20 carbon atoms, an unsubstituted hydrocarbyl group having 1 to 20 carbon atoms, an alkoxy group having 1 to 20 carbon atoms, a halogen, and combinations thereof.

In an embodiment, structure (I) includes $R_1$ and $R_3$ that are the same or different. Each of $R_1$ and $R_3$ is selected from a $C_1$-$C_8$ alkyl group, a $C_3$-$C_6$ cycloalkyl group, or a substituted $C_3$-$C_6$ cycloalkyl group. $R_5$-$R_{14}$ are the same or different and each of $R_5$-$R_{14}$ is selected from hydrogen, a $C_1$-$C_8$ alkyl group, and a halogen. Nonlimiting examples of suitable $C_1$-$C_8$ alkyl groups include methyl, ethyl, n-propyl, isopropyl, n-butyl, i-butyl, t-butyl, n-pentyl, i-pentyl, neo-pentyl, t-pentyl, n-hexyl, and 2,4,4-trimethylpentan-2-yl group. Nonlimiting examples of suitable $C_3$-$C_6$ cycloalkyl groups include cyclopentyl and cyclohexyl groups. In a further embodiment, at least one of $R_5$-$R_{14}$ is a $C_1$-$C_8$ alkyl group or a halogen.

In an embodiment, structure (I) includes $R_1$ that is a methyl group and $R_3$ that is a t-butyl group. Each of $R_2$, $R_4$ and $R_5$-$R_{14}$ is hydrogen.

In an embodiment, structure (I) includes $R_1$ and $R_3$ that is an isopropyl group. Each of $R_2$, $R_4$ and $R_5$-$R_{14}$ is hydrogen.

In an embodiment, structure (I) includes each of $R_1$, $R_5$, and $R_{10}$ as a methyl group and $R_3$ is a t-butyl group, Each of $R_2$, $R_4$, $R_6$-$R_9$ and $R_{11}$-$R_{14}$ is hydrogen.

In an embodiment, structure (I) includes each of $R_1$, $R_7$, and $R_{12}$ as a methyl group and $R_3$ is a t-butyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ as a methyl group and $R_3$ is a t-butyl group. Each of $R_7$ and $R_{12}$ is an ethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes each of $R_1$, $R_5$, $R_7$, $R_9$, $R_{10}$, $R_{12}$, and $R_{14}$ as a methyl group and $R_3$ is a t-butyl group. Each of $R_2$, $R_4$, $R_6$, $R_8$, $R_{11}$, and $R_{13}$ is hydrogen.

In an embodiment, structure (I) includes $R_1$ as a methyl group and $R_3$ is a t-butyl group. Each of $R_5$, $R_7$, $R_9$, $R_{10}$, $R_{12}$, and $R_{14}$ is an i-propyl group. Each of $R_2$, $R_4$, $R_6$, $R_8$, $R_{11}$, and $R_{13}$ is hydrogen.

In an embodiment, the substituted phenylene aromatic diester has a structure selected from the group consisting of structures (II)-(V), including alternatives for each of $R_1$ to $R_{14}$, that are described in detail in U.S. Pat. No. 8,536,372, which is incorporated herein by reference.

In an embodiment, structure (I) includes $R_1$ that is a methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a fluorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a chlorine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a bromine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an iodine atom. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_6$, $R_7$, $R_{11}$, and $R_{12}$ is a chlorine atom. Each of $R_2$, $R_4$, $R_5$, $R_8$, $R_9$, $R_{10}$, $R_{13}$, and $R_{14}$ is hydrogen.

In an embodiment, structure (I) includes $R_1$ that is a methyl group and $R_3$ is a t-butyl group. Each of $R_6$, $R_8$, $R_{11}$, and $R_{13}$ is a chlorine atom. Each of $R_2$, $R_4$, $R_5$, $R_7$, $R_9$, $R_{10}$, $R_{12}$, and $R_{14}$ is hydrogen.

In an embodiment, structure (I) includes $R_1$ that is a methyl group and $R_3$ is a t-butyl group. Each of $R_2$, $R_4$ and $R_5$-$R_{14}$ is a fluorine atom.

In an embodiment, structure (I) includes $R_1$ that is a methyl group and $R_3$ is a t-butyl group. Each of $R_7$ and $R_{12}$ is a trifluoromethyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is an ethoxycarbonyl group. Each of $R_2$, $R_4$, $R_5$, $R_6$, $R_8$, $R_9$, $R_{10}$, $R_{11}$, $R_{13}$, and $R_{14}$ is hydrogen.

In an embodiment, $R_1$ is methyl group and $R_3$ is a t-butyl group. Each of $R_7$ and $R_{12}$ is an ethoxy group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a t-butyl group. Each of $R_7$ and $R_{12}$ is a diethylamine group. Each of $R_2$, $R_4$, $R_5$, $R_6$, $R_8$, $R_9$, $R_{10}$, $R_{11}$, $R_{13}$, and $R_{14}$ is hydrogen.

In an embodiment, structure (I) includes $R_1$ that is a methyl group and $R_3$ is a 2,4,4-trimethylpentan-2-yl group. Each of $R_2$, $R_4$ and $R_5$-$R_{14}$ is hydrogen.

In an embodiment, structure (I) includes $R_1$ and $R_2$, each of which is a sec-butyl group. Each of $R_2$, $R_4$ and $R_5$-$R_{14}$ is hydrogen.

In an embodiment, structure (I) includes $R_1$ and $R_4$ that are each a methyl group. Each of $R_2$, $R_3$, $R_5$-$R_9$ and $R_{10}$-$R_{14}$ is hydrogen.

In an embodiment, structure (I) includes $R_1$ that is a methyl group. $R_4$ is an i-propyl group. Each of $R_2$, $R_3$, $R_5$-$R_9$ and $R_{10}$-$R_{14}$ is hydrogen.

In an embodiment, structure (I) includes $R_1$, $R_3$, and $R_4$, each of which is an i-propyl group. Each of $R_2$, $R_5$-$R_9$ and $R_{10}$-$R_{14}$ is hydrogen.

In an embodiment, another procatalyst composition is provided. The procatalyst composition includes a combination of a magnesium moiety, a titanium moiety and a mixed internal electron donor. As used herein, a "mixed internal electron donor" is (i) substituted phenylene aromatic diester, (ii) an electron donor component that donates a pair of electrons to one or more metals present in the resultant procatalyst composition, and (iii) optionally other components. In an embodiment, the electron donor component is a phthalate, a diether, a benzoate, and combinations thereof. The procatalyst composition with the mixed internal electron donor can be produced by way of the procatalyst production procedure as disclosed in the previously granted patents and publications identified herein.

For example, suitable catalyst compositions comprise a pro-catalyst composition, a co-catalyst, and an external electron donor or a mixed external electron donor (M-EED) of two or more different components. Suitable external donors include one or more activity limiting agents (ALA), one or more selectivity control agents (SCA) or both an ALA and an SCA. As used herein, an "external electron donor" is a component or a composition comprising a mixture of components added independent of procatalyst formation that modifies the catalyst performance. As used herein, an "activity limiting agent" is a composition that decreases catalyst activity as the polymerization temperature in the presence of the catalyst rises above a threshold temperature (e.g., temperature greater than about 85° C.). A "selectivity control agent" is a composition that improves polymer tacticity, wherein improved tacticity is generally understood to mean increased tacticity or reduced xylene solubles or both. It should be understood that the above definitions are not mutually exclusive and that a single compound may be Classified, for example, as both an activity limiting agent and a selectivity control agent.

In an embodiment, the external electron donor includes an alkoxysilane. The alkoxysilane has the general formula:

$$SiR_m(OR')_{4-m} \quad (1)$$

where R independently each occurrence is hydrogen or a hydrocarbyl or an amino group optionally substituted with one or more substituents containing one or more Group 14, 15, 16, or 17 heteroatoms, said R containing up to 20 atoms not counting hydrogen and halogen; R' is a $C_{1-4}$ alkyl group; and m is 0, 1, 2 or 3. In an embodiment, R is $C_{6-12}$ arylalkyl or aralkyl, $C_{3-12}$ cycloalkyl, $C_{3-12}$ branched alkyl, or $C_{3-12}$ cyclic or acyclic amino group, R' is $C_{1-4}$ alkyl, and m is 1 or 2.

Nonlimiting examples of suitable silane compositions include dicyclopentyldimethoxysilane; di-tert-butyldimethoxysilane; methylcyclohexyldimethoxysilane methylcyclohexyldiethoxysilane; ethylcyclohexyldimethoxysilane; diphenyldimethoxysilane; diisopropyldimethoxysilane; di-n-propyldimethoxysilane; diisobutyldimethoxysilane; diisobutyldiethoxysilane; isobutylisopropyldimethoxysilane; di-n-butyldimethoxysilane; cyclopentyltrimethoxysilane; isopropyltrimethoxysilane; n-propyltrimethoxysilane; n-propyltriethoxysilane; ethyltriethoxysilane; tetramethoxysilane, tetraethoxysilane; diethylaminotriethoxysilane; cyclopentylpyrrolidinodimethoxysilane; bis(pyrrolidino)dimethoxysilane; bis(perhydroisoquinolino)dimethoxysilane; and dimethyldimethoxysilane. In an embodiment, the silane composition is dicyclopentyldimethoxysilane (DCPDMS); methylcyclohexyldimethoxysilane (MChDMS) or n-propyltrimethoxysilane (NPTMS); and any combination of thereof.

In an embodiment, the selectivity control agent component can be a mixture of 2 or more alkoxysilanes. In a further embodiment, the mixture can be dicyclopentyldimethoxysilane and methylcyclohexyldimethoxysilane, dicyclopentyldimethoxysilane and tetraethoxysilane, or dicyclopentyldimethoxysilane and n-propyltriethoxysilane. In an embodiment, the mixed external electron donor may include a benzoate, a succinate, and/or a diol ester. In an embodiment, the mixed external electron donor includes 2,2,6,6-tetramethylpiperidine as an SCA. In another embodiment, the mixed external electron donor includes a diether as both an SCA and an ALA.

A mixed external electron donor system can also include an activity limiting agent (ALA). An ALA inhibits or otherwise prevents polymerization reactor upset and ensures continuity of the polymerization process. Typically, the activity of Ziegler-Natta catalysts increases as the reactor temperature rises. Ziegler-Natta catalysts also typically maintain high activity near the melting point temperature of the polymer produced. The heat generated by the exothermic polymerization reaction may cause polymer particles to form agglomerates and may ultimately lead to disruption of continuity for the polymer production process. The ALA reduces catalyst activity at elevated temperature, thereby preventing reactor upset, reducing (or preventing) particle agglomeration, and ensuring continuity of the polymerization process.

The activity limiting agent may be a carboxylic acid ester, a diether, a poly(alkene glycol), a diol ester, and combinations thereof. The carboxylic acid ester can be an aliphatic or aromatic, mono- or poly-carboxylic acid ester. Nonlimiting examples of suitable monocarboxylic acid esters include ethyl and methyl benzoate; ethyl p-methoxybenzoate; methyl p-ethoxybenzoate; ethyl p-ethoxybenzoate; ethyl p-isopropoxybenzoate; ethyl acrylate; methyl methacrylate; ethyl acetate; ethyl p-chlorobenzoate; hexyl p-aminobenzoate; isopropyl naphthenate; n-amyl toluate; ethyl cyclohexanoate and propyl pivalate.

Nonlimiting examples of suitable polycarboxylic acid esters include dimethyl phthalate; diethyl phthalate; di-n-propyl phthalate; diisopropyl phthalate; di-n-butyl phthalate; diisobutyl phthalate; di-tert-butyl phthalate; diisoamyl phthalate; di-tert-amyl phthalate; dineopentyl phthalate; di-2-ethylhexyl phthalate; di-2-ethyldecyl phthalate; diethyl terephthalate, dioctyl terephthalate; and bis[4-(vinyloxy) butyl]terephthalate.

The aliphatic carboxylic acid ester may be a $C_6$ aliphatic acid ester, may be a mono- or a poly-(two or more) ester, may be straight chain or branched, may be saturated or unsaturated, and any combination thereof. The $C_6$-$C_{30}$ aliphatic acid ester may also be substituted with one or more Group 14, 15 or 16 heteroatom containing substituents. Nonlimiting examples of suitable $C_6$-$C_{30}$ aliphatic acid esters include $Ci._2O$ alkyl esters of aliphatic $C_{6-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{6-20}$ mono- or polycarboxylate derivatives of $C_{2-100}$ (poly) glycols or $C_{2-100}$ (poly)glycol ethers. In a further embodiment, the $C_6$-$C_{30}$ aliphatic acid ester may be a laurate, a myristate; palmitate, a stearate, an oleate, a sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl in (acetate), glyceryl tri-ester of $C_{2-40}$ aliphatic carboxylic acids, and mixtures thereof. In a further embodiment, the $C_6$-$C_{20}$ aliphatic ester is isopropyl myristate or di-n-butyl sebacate.

In an embodiment, the activity limiting agent includes a diether. The di ether can be a 1,3-diether compound represented by the following structure (VI):

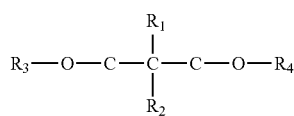

(VI)

wherein $R_1$ to $R_4$ are independently of one another an alkyl, aryl or aralkyl group having up to 20 carbon atoms, Which may optionally contain a group 14, 15, 16, or 17 heteroatom, and $R_1$ and $R_2$ may be a hydrogen atom. The dialkylether may linear or branched, and may include one or more of the following groups: alkyl, cycloaliphatic, aryl, alkylaryl or arylalkyl radicals with 1-18 carbon atoms, and hydrogen. $R_1$ and $R_2$ may be linked to form a cyclic structure, such as cyclopentadiene or fluorene.

In an embodiment, the activity limiting agent includes a succinate composition having the following structure (VII):

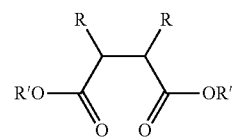

(VII)

wherein R and R' may be the same or different, R and/or R' including one or more of the following groups: hydrogen, linear or branched alkyl, alkenyl, cycloalkyl, aryl, arylalkyl or alkylaryl group, optionally containing heteroatoms. One or more ring structures can be formed via one or both 2- and 3-position carbon atom.

In an embodiment, the activity limiting agent includes a diol ester as represented by the following structure (VIII):

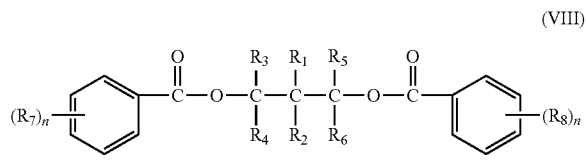

(VIII)

wherein n is an integer from 1 to 5. $R_1$ and $R_2$, may be the same or different, and each may be selected from hydrogen, methyl, ethyl, n-propyl, i-propyl, n-butyl, i-butyl, t-butyl, allyl, phenyl, or halophenyl group. $R_3$, $R_4$, $R_5$, $R_6$, $R_7$, and $R_8$ may be the same or different; and each may be selected from hydrogen, halogen, substituted, or unsubstituted hydrocarbyl having 1 to 20 carbon atoms. $R_1$-$R_6$ groups may optionally contain one or more heteroatoms replacing carbon, hydrogen or both, the hetero-atom selected from nitrogen, oxygen, sulfur, silicon, phosphorus and a halogen. $R_7$ and $R_8$, may be the same or different, and may be bonded to any carbon atom of the 2-, 3-, 4-, 5-, and 6-position of either phenyl ring.

Individual external electron donor components can be added into the reactor separately or two or more can be mixed together in advance and then added into the reactor as a mixture. In the mixture, more than one selectivity control agent or more than one activity limiting agent can be used. In an embodiment, the mixture is dicyclopentyldimethoxysilane and isopropyl myristate; diisopropyldimethoxysilane and isopropyl myristate; dicyclopentyldimethoxysilane and poly(ethylene glycol) laurate; dicyclopentyldimethoxysilane and isopropyl myristate and polyethylene glycol) dioleate; methylcyclohexyldimethoxysilane and isopropyl myristate; n-propyltrimethoxysilane and isopropyl myristate; dimethyldimethoxysilane and methylcyclohexyldimethoxysilane and isopropyl myristate; dicyclopentylditriethoxysilane and n-propyltriethoxysilane and isopropyl myristate; diisoproryldimethoxyilane and n-propyltriethoxysilane and isopropyl myristate; and dicyclopentyldimethoxysilane and tetraethoxysilane and isopropyl myristate; dicyclopentyldimethoxysilane and diisopropyldimethoxysilane and n-propyltriethoxysilane and isopropyl myristate; and combinations thereof.

The catalyst composition includes a cocatalyst. The cocatalyst for use with the Ziegler-Natta procatalyst composition may be an aluminum containing composition. Nonlimiting examples of suitable aluminum containing compositions include organoaluminum compounds, such as trialkylaluminum; dialkylaluminum hydride; alkylaluminum dihydride; dialkylaluminum halide; alkylaluminumdihalide; dialkylaluminum alkoxide; and alkylaluminum dialkoxide-compounds containing from 1-10, or 1-6 carbon atoms in each alkyl- or alkoxide-group. In an embodiment, the cocatalyst is a $C_{1-4}$ trialkylaluminum compound, such as triethylaluminum (TEA). The catalyst composition includes a mole ratio of aluminum (Al) to (SCA(s)+ALA(s)) of 0.5-25:1; or 1.0-20:1; or 1.5-15:1; or less than about 6.0; or less than about 5; or less than 4.5. In an embodiment, the Al:(SCA(s)+ALA(s)) mole ratio is 0.5-4.0:1. The total-SCA to ALA mole ratio is 0.01-20:1; 0.10-5.00:1; 0.43-2.33:1; or 0.54-1.85:1; or 0.67-1.5:1.

IV. APPLICATIONS

The propylene copolymers of the present disclosure can be used in numerous and diverse applications. As described above, the propylene copolymers have excellent flow characteristics in conjunction with relatively high stiffness, low xylene soluble content, and excellent transparency properties including long term transparency properties.

In one embodiment, the propylene copolymers of the present disclosure can be incorporated into a composition for forming injection molded articles, such as containers. For instance, the containers can have a bottom that defines a hollow interior and a top that includes a flange that seals to the bottom. In one embodiment, the containers may comprise hot fill packaging containers. The hot fill packaging containers, for instance, are well suited for being loaded with a product at higher temperatures. Containers made in accordance with the present disclosure are also well suited for microwave reheating of stored foods.

The propylene copolymers of the present disclosure can be combined with various other components and ingredients in formulating a polymer composition for making molded articles as described above. For instance, in one embodiment, the polymer composition can contain antioxidants and acid scavengers, and in some applications may preferably also contain other additives commonly used in PP such as nucleators, clarifiers, mold release agents, antistats, slip agents, UV stabilizers, and colorants (pigments).

In one embodiment, the copolymer composition can further contain a type of nucleator called a clarifying agent or clarifier. The Clarifying agent can be added to further improve the transparency properties of the composition. The clarifying agent, for instance, can comprise a compound capable of producing a gelation network within the composition.

In one embodiment, the clarifying agent may comprise a sorbitol compound, such as a sorbitol acetal derivative. In one embodiment, for instance, the clarifying agent may comprise a dibenzyl sorbitol.

With regard to sorbitol acetal derivatives that can be used as an additive in some embodiments, the sorbitol acetal derivative is shown in Formula (1):

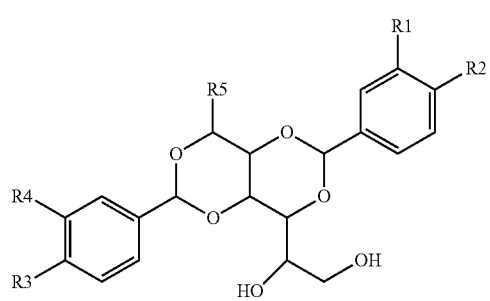

(I)

wherein R1-R5 comprise the same or different moieties chosen from hydrogen and a C1-C3 alkyl.

In some embodiments, R1-R5 are hydrogen, such that the sorbitol acetal derivative is 2,4-dibenzylidene sorbitol ("DBS"). In some embodiments, R1, R4, and R5 are hydrogen, and R2 and R3 are methyl groups, such that the sorbitol acetal derivative is 1,3:2,4-di-p-methyldibenzylidene-D-sorbitol ("MDBS"). In some embodiments, R1-R4 are methyl groups and R5 is hydrogen, such that the sorbitol acetal derivative is 1,3:2,4-Bis (3,4-dimethylobenzylideno) sorbitol. ("DMDBS"). In some embodiments, R2, R3, and R5 are propyl groups (—CH2-CH2-CH3), and R1 and R4 are hydrogen, such that the sorbitol acetal derivative is 1,2,3-trideoxy-4,6:5,7-bis-O-(4-propylphenyl methylene) nonitol ("TBPMN").

Other embodiments of clarifying agents that may be used include:
1,3:2,4-benzylidenesorbitol;
1,3:2,4-bis(p-methylbenzylidene)sorbitol;
Di(p-methylbenzylidene)Sorbitol;
Di(p-ethylbenzylidene)Sorbitol; and
Bis(5',6',7',8'-tetrahydro-2-naphtylidene)Sorbitol.

In one embodiment, the clarifying agent may also comprise a bisamide. The clarifying agents described above can be used alone or in combination.

When present in the polymer composition, one or more clarifying agents are generally added in an amount greater than about 1,500 ppm, such as in an amount greater than about 1,800 ppm, such as in an amount greater than about 2,000 ppm, such as in an amount greater than about 2,200 ppm. One or more clarifying agents are generally present in an amount less than about 20,000 ppm, such as less than about 15,000 ppm, such as less than about 10,000 ppm, such as less than about 8,000 ppm, such as less than about 5,000 ppm.

V. EXAMPLES

Example No. 1

Propylene-ethylene random copolymer samples were produced and their properties tested in accordance with the procedures outlined above. The properties and experimental results are outlined in Table 1.

The propylene-ethylene random copolymers were produced with a stereospecific 6$^{th}$ generation Ziegler-Matta magnesium supported/titanium-based catalyst. The catalyst contained a non-phthalate internal donor producing polymers having a broader molecular weight distribution than polymers made using metallocene catalyst. The process used to produce the polymers is described in the art as the UNIPOL gas phase process. The catalyst used to produce the polymers included a substituted phenylene aromatic diester internal electron donor. The catalyst used is commercially available from W.R. Grace and Company and sold under the trade name CONSISTA. All copolymers were made using tri ethylaluminum as a cocatalyst.

TABLE 1

Propylene-Ethylene Random Copolymer Examples

| Sample | Ethylene wt. % | XS (wt. %) wet | XS/ET | MFR (g/10 min) |
|---|---|---|---|---|
| 1 | 4.44 | 6.61 | 1.49 | 87.00 |
| 2 | 4.47 | 6.61 | 1.48 | 88.70 |

TABLE 1-continued

Propylene-Ethylene Random Copolymer Examples

| Sample | Ethylene wt. % | XS (wt. %) wet | XS/ET | MFR (g/10 min) |
|---|---|---|---|---|
| 3 | 3.9 | 5.42 | 1.39 | 50.29 |
| 4 | 4.2 | 5.42 | 1.30 | 62.28 |
| 5 | 4.54 | 5.81 | 1.28 | 59.71 |
| 6 | 4.57 | 5.81 | 1.27 | 66.80 |
| 7 | 4.39 | 6.28 | 1.43 | 81.63 |
| 8 | 4.37 | 6.28 | 1.44 | 94.40 |
| 9 | 4.39 | 6.10 | 1.39 | 95.81 |
| 10 | 4.41 | 6.10 | 1.38 | 96.09 |
| 11 | 4.45 | 6.15 | 1.38 | 95.53 |
| 12 | 4.47 | 6.15 | 1.38 | 91.69 |
| 13 | 4.20 | 5.70 | 1.36 | 88.64 |
| 14 | 4.26 | 5.70 | 1.34 | 88.16 |
| 15 | 4.21 | 6.18 | 1.47 | 89.63 |
| 16 | 4.19 | 6.18 | 1.47 | 91.69 |
| 17 | 4.25 | 6.25 | 1.47 | 91.95 |
| 18 | 4.24 | 6.25 | 1.47 | 91.69 |
| 19 | 4.23 | 6.16 | 1.46 | 89.39 |
| 20 | 4.23 | 6.16 | 1.46 | 88.64 |
| 21 | 4.14 | 6.04 | 1.46 | 81.63 |
| 22 | 4.15 | 6.04 | 1.46 | 83.11 |
| 23 | 3.29 | 4.74 | 1.44 | 50.19 |
| 24 | 3.27 | 4.74 | 1.45 | 52.47 |
| 25 | 3.26 | 4.89 | 1.50 | 49.28 |
| 26 | 3.22 | 4.80 | 1.49 | 49.23 |
| 27 | 3.18 | 4.80 | 1.51 | 49.10 |
| 28 | 3.22 | 4.41 | 1.37 | 49.40 |
| 29 | 3.20 | 4.41 | 1.38 | 49.16 |
| 30 | 3.25 | 4.18 | 1.29 | 48.26 |
| 31 | 3.17 | 4.04 | 1.27 | 45.89 |
| 32 | 3.21 | 4.42 | 1.38 | 47.90 |
| 33 | 3.15 | 4.42 | 1.40 | 45.20 |

Example No. 2

Another propylene-ethylene random copolymer was made in accordance with the present disclosure using generally the same process as described above and compared to a control having all XS/ET ratio of 2. The propylene-ethylene random copolymers were injection molded into test plaques and tested for haze. Haze was tested initially and after thermal aging. The propylene-ethylene random copolymers are as follows:

TABLE 2

Propylene-Ethylene Random Copolymer Examples

| Sample | Ethylene wt. % | XS (wt. %) wet | XS/ET | MFR (g/10 min) |
|---|---|---|---|---|
| Control | 4.10 | 8.2 | 2.00 | 40.7 |
| 34 | 3.78 | 5.0 | 1.33 | 42.4 |

Haze was measured according to ASTM Test D1003, procedure A using the latest version of the test. Haze was measured before and after 24 hour thermal aging at 55° C. using BYK Gardner Haze-Gard 4725 instrument. Thermal aging was conducted by placing the plaque samples into an oven. During thermal aging, propylene polymer compositions have a tendency to increase in haze. Haze is increased due to further crystallization within the polymer and/or due to the formation of a hazy surface layer, which is typically referred to as blooming.

In forming the test plaques, the propylene-ethylene random copolymers were compounded with various stabilizers. In particular, the polymer compositions contained 500 ppm of a hindered phenolic antioxidant, namely pentaerythritol tetrakis(3-(3,5-di-tert-butyl-4-hydroxyphenyl)propionate). A phosphite stabilizer was added at an amount of 700 ppm. The phosphite stabilizer was tris(2,4-ditert-butylphenyl) phosphite. An acid scavenger was added at a concentration of 200 ppm. The acid scavenger used was a hydrotalcite. An antistatic agent was added at a concentration of 500 ppm. The antistatic agent was composed of a distilled monoglyceride, particularly DIMODAN HS K-A GMS90 acid scavenger marketed by DuPont. A clarifying agent was also added to the compositions at a concentration of 1800 ppm. The clarifying agent used was 1,2,3-tridesoxy-4,6:5,7-bis-O-[(4-propylphenyl)methylene]nonitol.

The polymer compositions were injection molded into plaques having three thicknesses at 40 mil, 80 mil, and 125 mil. The plaques were tested for haze before and after oven aging. The following results were obtained:

| Haze Measurement | | | | | | | | | | | | | | |
|---|---|---|---|---|---|---|---|---|---|---|---|---|---|---|
| Before Oven % | | | After Oven % | | | After-Before | | | % Increase | | | Visual | Smear |
| Control | | | | | | | | | | | | | | |
| 9.5 | 22.4 | 42.6 | 15.0 | 26.0 | 49.6 | 5.5 | 3.6 | 7.0 | 36.7 | 13.9 | 14.2 | 4 | 4 |
| Sample 34 | | | | | | | | | | | | | | |
| 10.3 | 24.0 | 44.2 | 11.6 | 25.9 | 46.4 | 1.3 | 1.9 | 2.2 | 11.4 | 7.3 | 4.7 | N | N |

As shown above, the propylene-ethylene random copolymer of the present disclosure had unexpectedly better haze properties in comparison to similar conventional propylene-ethylene random copolymers. For example, one significant result is the fact that there is no visual blooming or smearing even after heat treatment.

As shown above, polymer compositions made in accordance with the present disclosure can display a haze at 40 mil of less than about 15%, such as less than about 12%, such as less than about 11%. In addition, after aging for 24 hours at 55° C., the haze increase is less than about 15%, such as less than about 14%, such as less than about 13%, such as less than about 12%. When measuring an 80 mil sample, the initial haze is generally less than about 35%, such as less than about 30%, such as less than about 25%. After thermal aging for 24 hours at 55° C., the % increase in haze is generally less than about 12%, such as less than about 11%, such as less than about 10%, such as less than about 9%, such as less than about 8%, such as less than about 7.5%. When measuring a 125 mil sample, the initial haze is generally less than about 50%, such as less than about 46%, such as less than about 45%. After thermal aging for 24 hours at 55° C., the % increase in haze is generally less than about 10%, such as less than about 8%, such as less than about 6%, such as less than about 5%.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A propylene-ethylene copolymer having high flow characteristics, wherein the propylene-ethylene copolymer comprises:
   a propylene content of greater than 90% by weight, the propylene-ethylene copolymer has an ethylene content (ET) in an amount of from 2.0% to 5.0% by weight, and wherein the propylene-ethylene copolymer has a xylene solubles fraction (XS) such that the propylene-ethylene copolymer has a xylene solubles to ethylene content ratio (XS/ET) of less than 1.51, and wherein the propylene-ethylene copolymer has a melt flow rate of greater than 45 g/10 min at a temperature of 230° C. and at a load of 2.16 kg, the and wherein propylene-ethylene copolymer has a molecular weight distribution (Mw/Mn) of greater than 2.8.

2. The propylene-ethylene copolymer as defined in claim 1, wherein the ethylene content is from 3.0% to 5.0% by weight.

3. The propylene-ethylene copolymer as defined in claim 1, wherein the ethylene content is from 3.1% to 4.7% by weight.

4. The propylene-ethylene copolymer as defined in claim 1, wherein the xylene solubles to ethylene content ratio (XS/ET) is from 1.2 to 1.5.

5. The propylene-ethylene copolymer as defined in claim 1, wherein the propylene-ethylene copolymer has a melt flow rate of greater than 45 g/10 min and less than 140 g/10 min.

6. The propylene-ethylene copolymer as defined in claim 1, wherein the propylene-ethylene copolymer has a melt flow rate of from 80 g/10 min to 100 g/10 min.

7. The propylene-ethylene copolymer as defined in claim 1, wherein the propylene-ethylene copolymer has a melt flow rate of from 50 g/10 min to 80 g/10 min.

8. The propylene-ethylene copolymer as defined in claim 1, wherein the copolymer has a xylene solubles fraction of from 4% to 7% by weight.

9. The propylene-ethylene copolymer as defined in claim 1, wherein the propylene-ethylene copolymer is formed using a Ziegler-Natta catalyst system, wherein the catalyst system includes an internal electron donor comprising a substituted phenylene aromatic diester.

10. The propylene-ethylene copolymer as defined in claim 9, wherein the catalyst system further includes a dicyclopentyldimethoxysilane based donor.

11. The propylene-ethylene copolymer as defined in claim 9, wherein the catalyst system further includes a n-propyltrimethoxysilane based donor.

12. The propylene-ethylene copolymer as defined in claim 1, wherein the propylene-ethylene copolymer is produced without the use of metallocenes.

13. A polymer composition containing the propylene-ethylene copolymer as defined in claim 1, wherein the propylene-ethylene copolymer is present in the polymer composition in an amount greater than 70% by weight.

14. The polymer composition as defined in claim 13, wherein the polymer composition further contains an antioxidant, an acid scavenger, or mixtures thereof.

15. The polymer composition as defined in claim 14, further comprising a clarifying agent.

16. The polymer composition as defined in claim 15, wherein the clarifying agent comprises a dibenzylidene sorbitol or a nonitol.

17. The polymer composition as defined in claim 15, wherein the polymer composition displays a haze at 40 mil of less than 15% and wherein after thermal aging for 24 hours at 55° C., the haze decreases by no more than 15%.

18. An injection molded article formed from the polymer composition as defined in claim 13.

19. A film formed from the polymer composition as defined in claim 13.

20. A hot fill packaging container made from the polymer composition as defined in claim 13.

* * * * *